Figure 1:
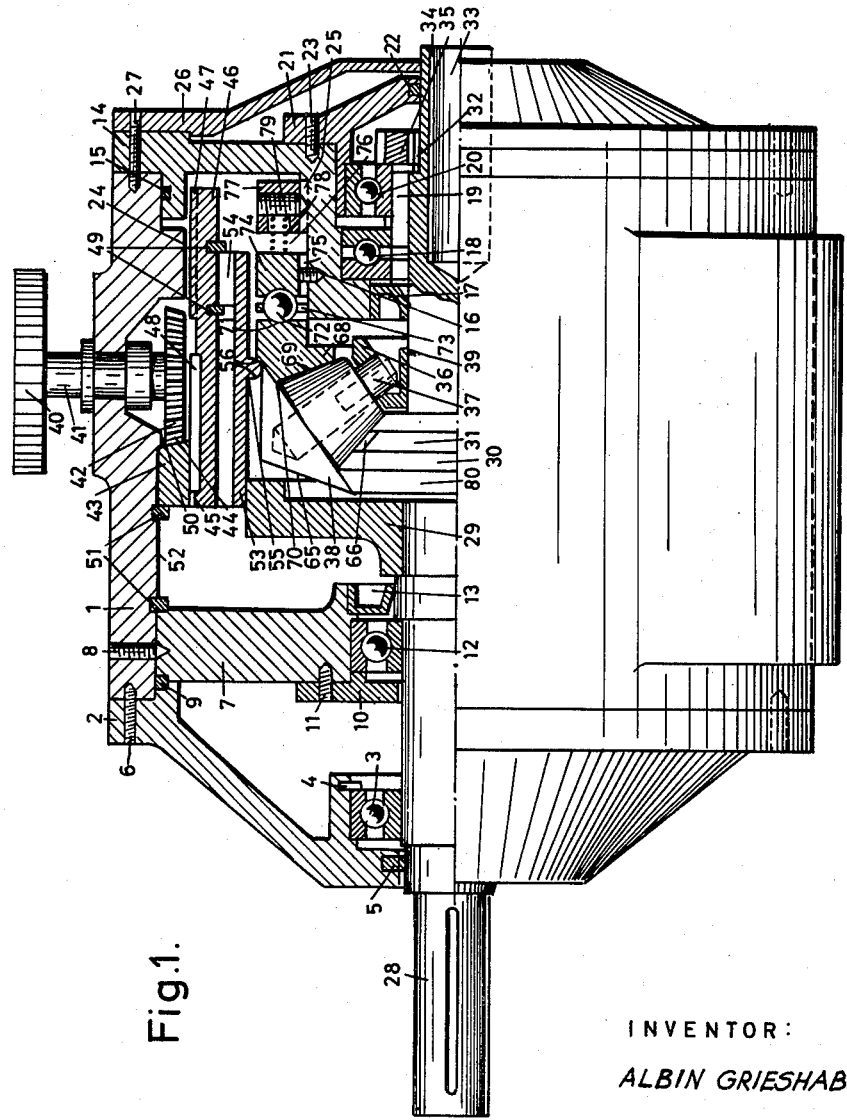

May 11, 1965     A. GRIESHABER     3,182,519
FRICTION GEAR

Filed Jan. 21, 1963     3 Sheets-Sheet 1

INVENTOR:

ALBIN GRIESHABER

By Toulmin & Toulmin

ATTORNEYS

May 11, 1965  A. GRIESHABER  3,182,519
FRICTION GEAR
Filed Jan. 21, 1963  3 Sheets-Sheet 2
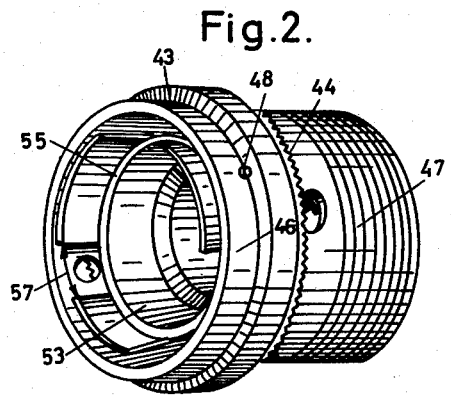
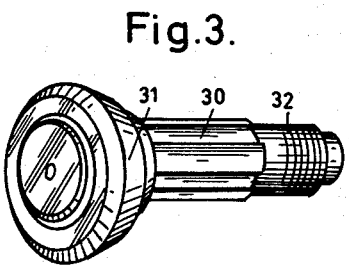
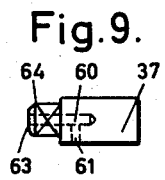
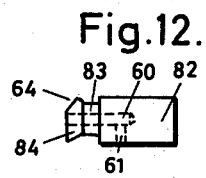
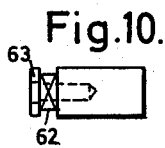
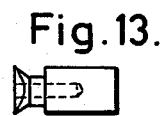
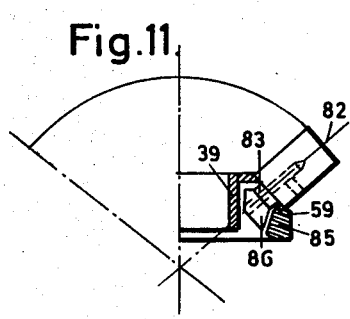
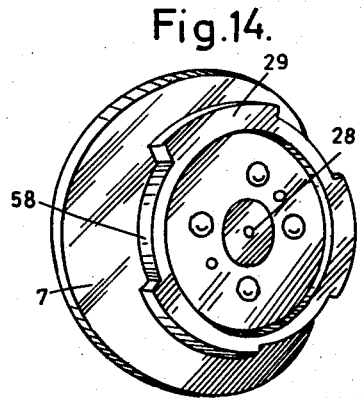
INVENTOR:
ALBIN GRIESHABER
By Toulmin & Toulmin
ATTORNEYS

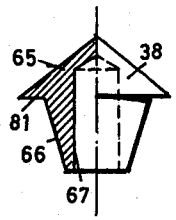
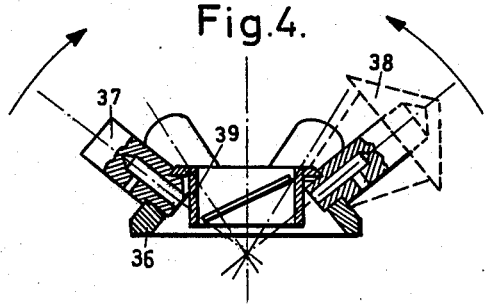
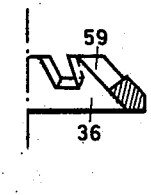
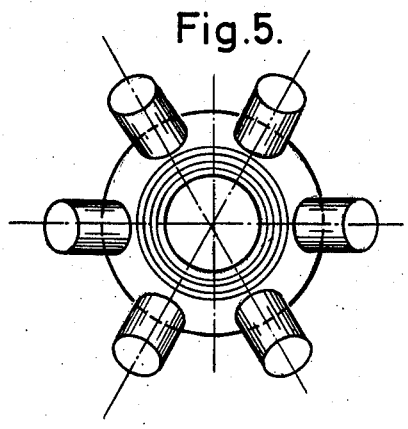
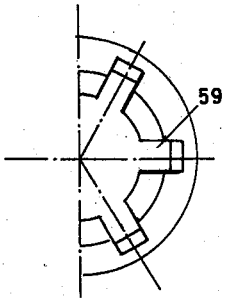

United States Patent Office 3,182,519
Patented May 11, 1965

3,182,519
FRICTION GEAR
Albin Grieshaber, Hauptstrasse 1, Wolfach,
Black Forest, Germany
Filed Jan. 21, 1963, Ser. No. 252,847
Claims priority, application Germany, Apr. 21, 1962,
G 34,795
5 Claims. (Cl. 74—191)

The invention relates to a friction roller drive for the stepless, i.e. continuous, variable control of rotary speeds and torques by means of rotary tapered rollers.

The invention aims to provide such a friction roller drive constructed so as to be cheap to produce, able to compensate automatically during operation for manufacturing inaccuracies present in individual components, free from slipping, of good performance, completely safe to operate and of great durability.

Disadvantages shared by all known friction roller drives are uneconomical operation and low durability. The strong application pressure of the tapered rollers on the driving cone gives rise to considerable heating and may easily cause slipping and thus great wear at low speeds. The tapered rollers also tend to cant on the driving cone and slip off it. Moreover, if conventional supporting rings are mounted, the tapered rollers become wedged between the driving cone and the supporting ring, since the rollers can hardly be made absolutely true.

The aim of the invention is to avoid these disadvantages and to provide a friction drive which runs economically with high performance, the manufacturing inaccuracies of which cause no trouble during operation, and which automatically controls the positive connection of the tapered rollers.

According to the invention, in a friction roller drive for the continuously variable control of rotary speeds and torques by means of double cone rotary tapered rollers having pointed cones pressing against the friction shoulder of an axially displaceable rotary runner ring, the tapered rollers being mounted for axial displacement and tilting with variable positive connection between the stepped friction surface of a driving cone and the unstepped supporting surface of a supporting ring.

This construction enables an economically operating friction roller gear having a high performance and great durability to be made at a low production cost.

By providing a screw-threaded portion in the housing having a multiple thread and being in engagement with the threaded portions of an adjusting ring, a safe guiding means is provided which cannot jam during operation.

A handwheel, which is mounted in the housing and is connected to a bevel gear by a spindle, is in engagement with the bevel teeth of a controlling adjustment ring and is used to set the desired speed. The controlling adjustment ring is mounted for rotation in the housing and is made axially displaceable in the housing by means of grooves and feathers.

The runner ring and friction ring are mounted in the adjustment ring to transmit the speed. The runner ring may be equipped with a fixed bearing collar or with a ball bearing. If ball bearings are provided, it is desirable for the runner ring to form the widened inner race of the ball bearing, since this represents a saving in manufacturing costs and increases the efficiency of the bearing.

In order to improve heat withdrawal, it is desirable to provide the adjustment ring with perforations so that the oil circulates better.

To enable the friction drive to be built compactly, the runner ring can be provided with recesses engaged by corresponding recesses of a clutch plate. In this way an axially displaceable dog clutch is formed taking up little space.

The arrangement of the tapered rollers between the driving cone and the supporting ring with variable positive connection opens up completely new power transmission possibilities. The supporting ring may form part of a thrust ball bearing firmly pressed against the tapered rollers by a displaceable ball pressure disc and compression springs. The spring pressure can be adapted to operating conditions by means of a nut mounted on a flanged bearing.

The stepped friction surface of the driving cone prevents the tapered rollers from canting and enables the generatrices of the cones to be constantly applied to two points on the friction surface, since the stepped friction surface of the driving cone and the unstepped supporting surface of the supporting ring are parallel to the generatrices of the frusta of the tapered rollers.

The tapered rollers are placed on roller shafts in a roller cage mounted on a cylindrical shaft of the driving cone. The roller shafts may have square pegs and guide bars which are placed in recesses in the roller cage. They are held against unintentional detachment in the roller cage by pressing in bushings. With this arrangement the roller shafts are radially tiltable in the central plane. This construction enables manufacturing inaccuracies in the tapered rollers to be compensated in operation.

Instead of giving the roller shafts square pegs, cylindrical pegs with spherical pieces can be provided, although in this case the recesses in the roller cage must also have spherical cutouts. This makes it possible to give the roller shafts freedom of movement in all directions, so that adjustment of the tapered rollers during operation can be made still easier.

These structural features are very important to the production of the tapered rollers, since disparities from the intended central axis nearly always arise when the bores are made for the roller shafts and the tapered rollers consequently run out of true, which would lead to immediate wedging if it took place during operation with rigid roller shafts.

It is desirable for the gear chamber and the bearings to have separate lubricating systems. In the gear chamber the lubricating quality of the oil is rapidly impaired by the frictional pressures that arise. The correct thing is therefore to smear the input and output bearings with grease.

For reasons of operating technique, it is important to mount the output shaft with clutch plate in double bearings, so as to prevent the clutch plate from canting and thus jamming with the runner ring.

For reasons of manufacturing technique and assembly all the power transmitting elements except the friction ring of the runner ring are arranged in the flanged bearing.

The invention has the following advantages:

Good performance due to the arrangement of the tapered rollers between the driving cone and the supporting disc, with the positive connection varying during operation; owing to the stepped friction surface of the driving cone a two-point bearing is always obtained for the tapered roller. When a plurality of tapered rollers are provided there is always good application. Slipping cannot arise due to the adjustability of the tiltable roller shafts and thus of the tapered rollers in conjunction with the supporting disc subject to spring pressure.

Since the construction enables manufacturing inaccuracies in the tapered rollers and roller shafts to be automatically compensated for during operation of the gear, the economy of production should particularly be emphasized.

Due to the fact that the rotary runner ring and the clutch plate of the driven shaft form a dog clutch which is axially displaceable while operating, the overall length of the gear is kept small. It is therefore very simple and comparatively inexpensive to fit and remove the driven shaft and clutch plate.

The fact that the adjustment ring is guided in the threaded portion of the housing makes for good axial displacement, and the jamming that occurs with the usual slot and pin guides is eliminated.

Easy and reliable setting of the desired speed of the controlling adjustment ring is ensured by the spindle drive having bevel teeth.

The arrangement of all the power-transmitting elements on the flanged bearing makes fitting and dismantling simple and cheap.

The division of the housing into the oil-filled gear chamber and the greased bearing spaces considerably increases operating reliability, since the bearings cannot be destroyed by the formation of oil carbon.

Examples of the invention are illustrated in the accompanying drawing, wherein:

FIG. 1 is a partial longitudinal section through the friction drive,

FIG. 2 is a perspective view of the adjustment ring together with the displaceable controlling adjustment ring and the rotary runner ring, FIG. 3 shows the driving cone, FIG. 4 is a section through the roller cage with the roller shafts and bushing, FIG. 5 is a plan view thereof, FIG. 6 is a partial section through the roller cage, FIG. 7 is a partial plan view thereof, FIG. 8 shows the tapered roller, FIG. 9 is a front elevation of the roller shaft, FIG. 10 is a plan view thereof, FIG. 11 is a partial section through a modified roller cage and roller shaft showing the spherical pieces and bushing, FIG. 12 is an elevation of the modified roller shaft, FIG. 13 is a plan view of the modified roller shaft, and FIG. 14 is a perspective view of the clutch plate with the driven shaft and housing plate.

The handwheel 40, the spindle 41 and the bevel gear 42 are fitted in the housing 1 so that they do not become lost. Fitted for rotation in the bore 52 in the housing 1 is the controlling adjustment ring 43 with bevel teeth 44, the ring 43 being displaceably mounted on the adjustment ring 46 by means of grooves 45 and feathers 48. The ring is kept in position by the abutment 50 in the housing 1 and by a securing ring 51. Its bevel teeth 44 engage with the bevel gear 42.

By turning the handwheel 40 the controlling adjustment ring 43 is turned together with the adjustment ring 46, in one direction or the other, the ring 46 being moved axially in either direction depending on the direction of rotation and governed by the threaded portion 24 in the housing 1 and the threaded portion 47 on the adjustment ring 46.

The rotary runner ring 53 is mounted in the adjustment ring 46 with the fixed bearing collar 54 or with a ball bearing (in which case the ring 53 constitutes the inner race of the ball bearing) and is held in position by securing rings 49. The friction ring 55 is mounted in the runner ring 53 with phases 56 on both sides for transmitting the various speeds and torques.

The housing plate 7, together with the driven shaft 28 and the coupling plate 29, is fitted in the bore 52 in the housing 1. The driven shaft 28 is mounted in the housing plate 7 with the aid of the ball bearing 12. The ball bearing 12 is secured by the bearing cover 10 with screws 11. The friction gear chamber is sealed off by the radial sealing ring 13. The housing plate 7 is secured by the securing ring 51 and the projection on the bearing plate 2. The screw 8 prevents the housing plate 7 from turning.

The bearing plate 2 is fixed to the housing 1 by the screws 6. The sealing ring 9 is arranged between the housing plate 7 and the bearing plate 2. The driven shaft 28 is mounted in the bearing plate 2 with the aid of the ball bearing 3, which is held by the securing ring 4. Sealing of the bearing plate 2 is effected by the sealing ring 5.

The coupling or clutch plate 29, which is fixed to the driven shaft 28, has recesses 58 engaging the rotary runner ring 53, which also has recesses 57. This axially displaceable dog clutch transmits the speed to the driven shaft 28.

The conical drive member 30 is mounted for rotation in the flanged bearing 14 by means of the ball bearing 20 and the thrust bearing 18 which are fixed together by the spacing sleeve 19. When the friction drive is being assembled, the spacing sleeve 19 is pushed onto the cylindrical projection on the driving conical drive member 30 and clamped fast by the nut 35 which is screwed onto the threaded portion 32.

The flanged bearing 14 is fitted into the housing 1 opposite the bearing plate 2. The sealing of the housing 1 from the bearing 14 is effected by the sealing ring 15.

The flanged bearing 14, carrying the most important structural elements of the friction drive, can be removed from the housing 1 after the screws 27 and the cover plate 26 have been detached; this is of great value to production and assembly.

The flanged bearing 14 has a threaded portion 25 onto which the nut 77 is screwed. The nut 77 has bores for guiding and mounting the compression springs 76. The compression springs 76 firmly press the movable ball pressure-disc 74 against the balls 72, which are held in the ball guide-disc 73, thus supplying the thrust cone 68 with the necessary pressure for applying it to the tapered rollers 38. The application pressure can be increased or reduced according to the power required by turning the nut 77. The nut 77 is secured after adjustment by the threaded pin 79. The movable ball pressure-disc 74 is prevented from turning by the pin 16 which engages in the groove 75.

The tapered rollers each are formed of two cones of inverse slope, the first of the cones 66 of the tapered rollers being located between the drive member 30 and the thrust cone 68 and forming idler gears with the drive member 30 and the thrust cone 68, the second of the cones 38 of the tapered rollers being integral with one end of the first cone 66 of the tapered rollers.

The thrust cone 68 carries the ball guide track 71 for the balls 72. Its limiting cone 70 serves as a support for the supporting surface 81 of the tapered roller cone 38. The phase 56 is provided to prevent the limiting cone 70 from striking the friction ring 55 of the rotary runner ring 53 and being damaged. The one-part supporting surface 69 is used for support and power transmission of the cone 66 of the tapered roller. The generatrices of the cone 66 and of the supporting surface 69 are parallel. The resilient arrangement of the thrust cone 68 enables inaccuracies in the tapered rollers 38 to be compensated for without any disturbance while the gear is running.

The gear chamber is sealed by the radial sealing ring 17 mounted in the flanged bearing 14. The ball bearing 20 is pressed into the bearing plate 21 which is fixed to the flanged bearing 14 with screws 23. Sealing from the conical drive member 30 is effected by the sealing ring 22.

The roller cage 36, carrying the roller shafts 37 and the tapered rollers, is arranged on the cylindrical shaft of the driving cone 30. The drive member 30 has a stepped friction surface 31, on which the frusta 66 run. The two generatrices are parallel. The stepped friction surface 31 compensates for inaccuracies in the tapered rollers in transmitting torques and thus ensures trouble-free operation. The limiting cone 80 guides the supporting surface 81 of the tapered roller cone 38.

The tapered rollers are guided by the roller cage 36, in which the roller shafts 37 provided with lubrication bores 60, 61, are mounted for tilting movement in a radial direction. The roller cage 36 has recesses 59 into which the square pegs 62 of the roller shafts 37 are pushed. The guide bars 63 prevent the roller shafts 37 from slipping out. The roller shafts 37 have bevels 64 giving the necessary play relatively to the bushing 39 which is pressed into the roller cage 36. The tilting arrangement of the roller shafts 37 compensates for manufacturing inaccuracies in the bores 67 in the tapered rollers while the friction drive is running (see FIGS. 4, 5, 6, 7, 9 and 10).

It is also possible, however, to mount roller shafts 82 in a roller cage 85 for tilting movement in all directions (FIGS. 11 and 12. The roller shafts 82, again with lubrication bores 60, 61, have cylindrical pegs 83 and spherical pieces 84 with bevels 64. The roller shafts 82 are pushed into the recesses in the roller cage 85, the recesses having spherical cutouts 86. The bushing 39, which is a pressed fit, prevents the roller shafts 82 from falling out.

When fitting the flanged bearing 14 with its assembled structural elements, care should be taken to ensure that the axial generatrices of the pointed cones of the tapered roller cones 38 are firmly applied to the axial friction surface of the friction ring 55 of the rotary runner ring 53. The application pressure can be adjusted by the nut 77. The shaft of the electric motor (not shown) fitted to the housing 1 is inserted in the bore 33 in the conical driving member 30, a key for such shaft engaging the groove 34.

The control elements in the friction drive chamber run in an oil bath, whereas the bearings of the driven shaft and of the driving cone are lubricated with grease.

The friction gear operates as follows:

The constant speed of the motor is transmitted directly to the drive member 30. Owing to the stepped friction surface 31 of the driving cone 30 and the unstepped supporting surface 69 of the thrust cone 68, rotary movement is transferred to the frusta 66 and pointed cones of the tapered roller cones 38 and thus to the friction surface of the friction ring 55 of the rotary runner ring 53, and a positive connection is formed. The clutch plate 29 connects with axial movement the rotary runner ring 53 to the driven shaft 28. In order to obtain continuously variable adjustment of the output speed within the limits determined by the construction, the handwheel 40 having the spindle 41 and bevel gear 42 is turned, thus turning the controlling adjustment ring 43, the bevel teeth 44 of which engage with the bevel gear 42, and the adjustment ring 46. Owing to the threaded portion 47 of the housing 2, turning of the handwheel 40 causes axial displacement of the adjustment ring 46 and of the runner ring 53 mounted for rotation therein. Hence the friction ring 55 moves axially along the generatrices of the pointed cones of the tapered roller cones 38 and, due to the different peripheral speeds of the pointed cones 65, takes on corresponding rotary speeds.

The novel construction of the friction drive ensures freedom from disturbance and reliable operation.

The pivotal arrangement of the roller shafts 37 enables compensation to be made for any manufacturing inaccuracies in the tapered rollers and particularly in the bores 67 therein for receiving the roller shafts 37. This arrangement gives the tapered rollers two degrees of freedom. One consists in the rollers being axially displaceable, i.e. able to adjust themselves automatically to the necessary diameter as a result of the wedging action. The second degree of freedom consists in the tapered rollers still being able to move and adjust themselves accordingly in the central plane owing to their pivotal arrangement.

The conical drive member 30 has the stepped friction surfaces 31, while the thrust cone 68 has the unstepped supporting surface 69. Both surfaces are parallel to the generatrices of the frusta 66 of the tapered rollers 38. This makes it possible for the members to adjust to one another. The adjustment of the members to one another is further aided by the resilient, positive connection arrangement of the thrust cone 68, since this enables manufacturing inaccuracies to be compensated for instead of causing the tapered rollers to cant and wedge on the integral supporting surface 69 of the thrust cone 68. Again, when the tapered rollers move along the stepped friction surface 31 of the conical drive member 30 they do not slide off the surface 31 since they still bear on it at two points.

I claim:

1. A variable speed power transmission comprising a fixed housing, a conical drive member rotatably mounted in said housing, a thrust cone mounted in said housing coaxial with said drive member, a plurality of tapered rollers each formed by two cones of inverse slope, the first of said cones of said tapered rollers being located between said drive member and said thrust cone and forming idler gears with said drive member and said thrust cone, a rotary runner ring mounted in said housing coaxial with said drive member and having an annular contact surface means in friction driving contact with the tapered surfaces of the second of said cones of said tapered rollers, means to shift said annular contact surface means parallel to the axis of said driven member, a driven shaft in alignment with said drive member, a coupling plate on said driven shaft, means connecting said coupling plate to said rotary runner ring, and means for applying an axial thrust on said idler gears whereby the frictional contact between said tapered rollers and said annular contact surface means of said drive member may be increased when the torque to be transmitted by the power transmission increases.

2. A power transmission according to claim 1, wherein said thrust cone is axially shiftable and rotatably mounted in said housing, and wherein said means for applying an axial thrust on said idler gears comprises compression springs.

3. A power transmission according to claim 1, wherein the means to shift said annular contact surface means parallel to the axis of said drive member comprises an adjustment ring encircling said rotary runner ring, and connected thereto, said adjustment ring having screw thread connection with the housing for adjustment axially of the housing, and means for rotating said adjustment ring.

4. A power transmission according to claim 1, wherein said conical drive member has an oppositely sloping limiting cone which contacts the base of said second of said cones of said tapered rollers.

5. A power transmission according to claim 1, wherein said conical drive member has a drive cone contacting the tapered surface of the first of said cones of said tapered rollers, and said drive cone having stepped conical friction surfaces.

References Cited by the Examiner

UNITED STATES PATENTS

| | | | |
|---|---|---|---|
| 1,120,266 | 12/14 | Bradley | 74—191 |
| 1,887,505 | 11/32 | Gibson | 74—796 |
| 2,574,530 | 11/51 | Castagna | 74—796 |
| 2,929,273 | 3/60 | Weber | 74—796 |
| 3,023,642 | 3/62 | Maichen | 74—796 |
| 3,023,643 | 3/62 | Weber | 74—193 X |

DON A. WAITE, *Primary Examiner.*